E. KOCSIS.
RAILROAD ENGINE WHEEL.
APPLICATION FILED MAY 4, 1918.
1,316,487.
Patented Sept. 16, 1919.
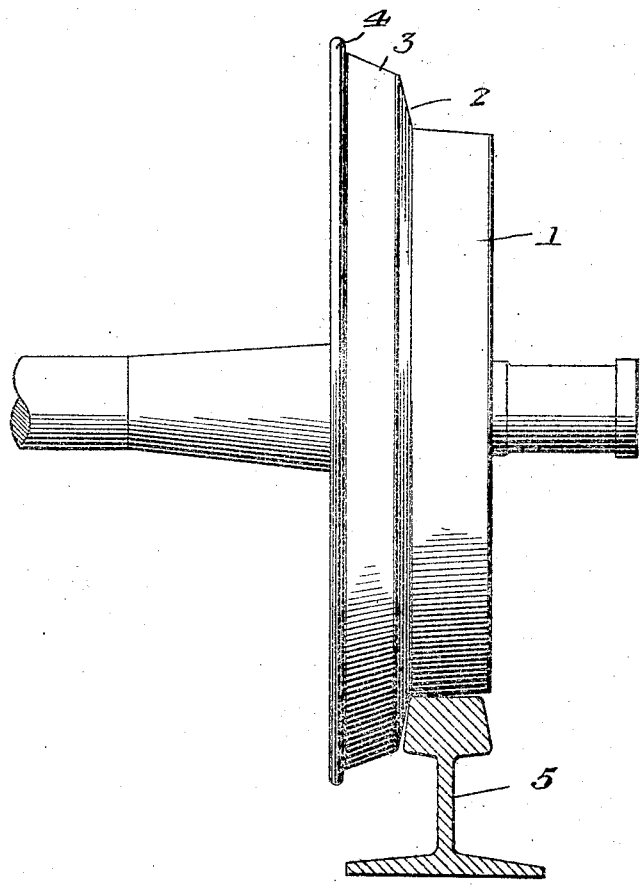
Witness
T. H. Parnell,
R. M. Smith.
Inventor
Elias Kocsis
By Victor J. Evans
Attorney

UNITED STATES PATENT OFFICE.

ELIAS KOCSIS, OF ALLIANCE, OHIO.

RAILROAD-ENGINE WHEEL.

1,316,487.  Specification of Letters Patent.  Patented Sept. 16, 1919.

Application filed May 4, 1918. Serial No. 232,615.

*To all whom it may concern:*

Be it known that I, ELIAS KOCSIS, a citizen of the United States, residing at Alliance, in the county of Stark and State of Ohio, have invented new and useful Improvements in Railroad-Engine Wheels, of which the following is a specification.

This invention relates to railway vehicle wheels, the object in view being to provide what may be termed a safety anti-derailment for a car wheel embodying a plurality of treads and flanges, whereby in case of a partial derailment of an engine or car, equipped with the improved wheels, the wheels will engage the rails in such a manner as to return the proper or main treads of the wheels to their operative relation to the railway rails.

With the above and other objects in view, the invention consists in the construction, combination and arrangement of parts, as herein described, illustrated and claimed.

The accompanying drawing represents an edge elevation of the improved wheel, showing a rail in cross section and the relative normal disposition of said parts.

The improved railway rail comprises a main tread 1, a beveled shoulder 2 at the inner side of the tread 1, an auxiliary or emergency tread 3 and an emergency or auxiliary flange 4.

The tread 1 normally rests upon the head of the railway rail 5 and is only slightly beveled, being approximately cylindrical and in accordance with the present day railway car wheel tread. The emergency tread 3 is steeply pitched or beveled as illustrated in the drawing, and the annular shoulder 2 between the treads 1 and 3 is pitched or beveled still more steeply and forms the main flange of the wheel when the main tread 1 is in its normal relation to the rail 5. The emergency or auxiliary flange 4 resembles the ordinary main flange of the present day railway car wheel.

In case of partial derailment of an engine or car equipped with the improved wheels, the steeply beveled or inclined tread 3 will temporarily rest upon the head of the rail, but by reason of its steep bevel, it will gradually work inwardly and in conjunction with the steeply beveled shoulder or flange 2, automatically return the wheel, as a whole, to its normal position and relation to the rail. A great many accidents will thus be avoided as compared with the present day wheel now in common use. As above stated, the flange 2 is the most deeply beveled portion and coöperates with the beveled emergency tread 3 to return the wheel from the tread 3 upon the track gradually without any sudden drop which would obviously occur if the flange 2 was at right angles to the emergency flange 3. This construction eliminates unnecessary jar and vibration and also strain upon the wheel and its associated parts, when the latter has become derailed and is returned from the flange 3 to its proper position upon the track.

I claim:

A safety wheel for railway vehicles, including a main tread, substantially cylindrical, an auxiliary tread spaced from the main tread, and beveled in the direction of the latter, the auxiliary tread being of greater diameter than the main tread, a shoulder interposed between said treads and connecting the latter, said shoulder being more steeply beveled than the auxiliary tread and constituting a flange for the main tread, and a flange on the auxiliary tread.

In testimony whereof I affix my signature.

ELIAS KOCSIS.